March 7, 1950 G. M. EHLERS ET AL 2,499,634
ELECTRICAL CAPACITOR
Filed May 31, 1946
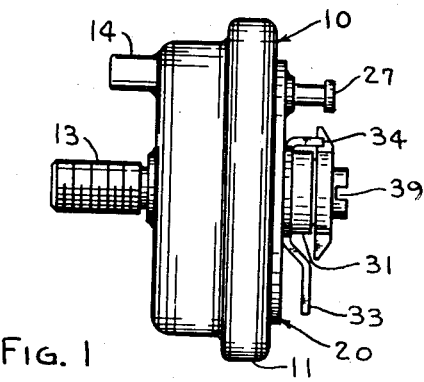
FIG. 1
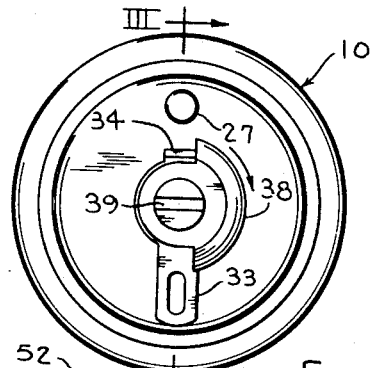
FIG. 2
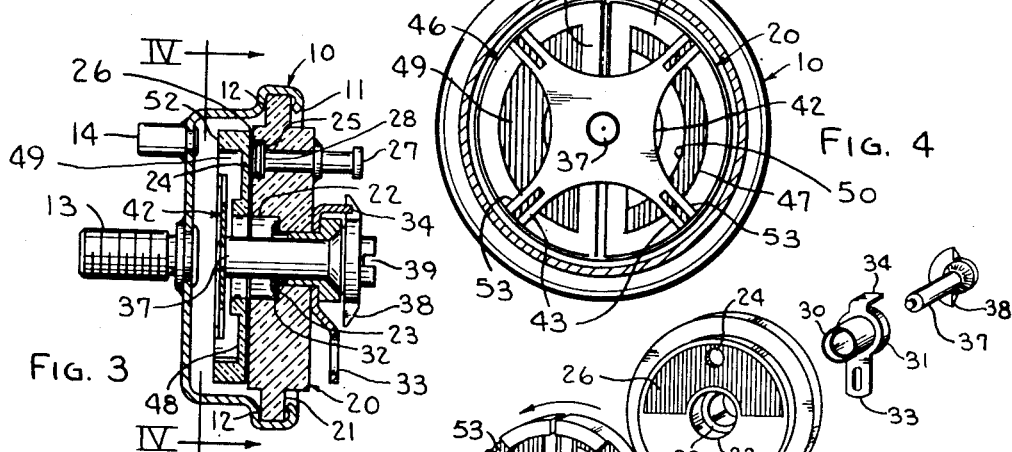
FIG. 3
FIG. 4
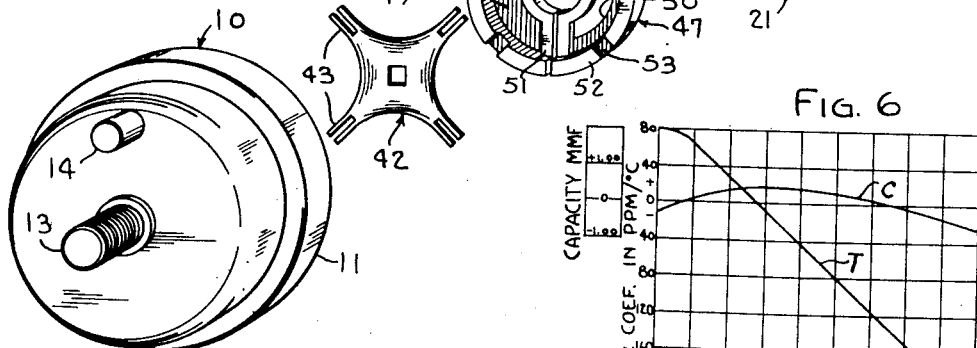
FIG. 5
FIG. 6
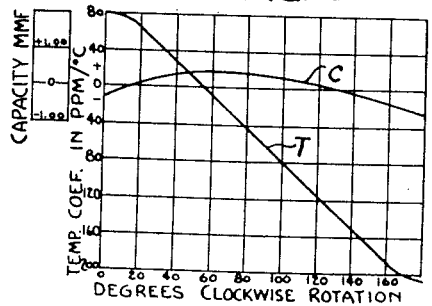
INVENTORS
GEORGE M. EHLERS
GEORGE T. KODAMA
BY John W. Michael
ATTORNEY Patented Mar. 7, 1950

2,499,634

UNITED STATES PATENT OFFICE 2,499,634

ELECTRICAL CAPACITOR

George M. Ehlers and George T. Kodama, Milwaukee, Wis., assignors to Globe-Union Inc., Milwaukee, Wis., a corporation of Delaware Application May 31, 1946, Serial No. 673,471

1 Claim. (Cl. 175—41.5)

This invention relates to improvements in capacitors of the variable capacity type and particularly to capacitors employing several dielectric members with a negative and a positive temperature coefficient respectively for use of such dielectrics in various combinations to maintain a substantially given capacitance over a wide temperature range.

Dielectric materials are known, as for example in United States Patent 2,398,088 to Ehlers and Roup, April 9, 1946, by which either a negative or positive temperature coefficient of the dielectric constant may be obtained, that is, the capacitance change respective to temperature may be predetermined by using a dielectric composition in which the capacity decreases or increases with increasing temperature to give respectively negative and positive temperature coefficients. The present invention makes use of such different dielectric compositions to obtain a capacitor employing such dielectrics in such relation, with at least one of the conductive plates, that changes in temperature are compensated by slight changes in the position of the dielectrics relative to a stationary conductive plate in varying combinations to obtain a controlled or predetermined capacitance change over a wide temperature range.

It is therefore one object of the present invention to provide a variable type electric capacitor in which the capacitance change is controlled when the temperature about the capacitor varies within wide limits.

Another object of the invention is to provide a variable capacitor in which it is possible to obtain any desired capacitance change over a predetermined range of changing ambient temperature.

A further object of the invention is to provide a variable capacitor in which the rate of change of capacitance is varied as the degree of rotation of the conductive plates vary relative to each other.

And a further object of the invention is to provide a variable capacitor which may be used as a test instrument for determining the capacitance change required in a given circuit upon use of the circuit over a predetermined temperature range.

Another object of the invention is to provide a variable capacitor in which several dielectrics severally having negative and positive temperature coefficients and supporting the movable conductive plates, are so adjustable simultaneously and sequentially or successively relative to a fixed conductive capacitor plate or plates as to compensate for circuit changes upon change in ambient temperature.

A further object of the invention is to provide a capacitor with a minimum number of parts readily assembled and employing a plurality of dielectrics having different temperature coefficients for their dielectric constants, the several dielectrics being so related to each other and to one of the conductive plates that a relatively simple and slight simultaneous adjustment of the plural movable dielectrics and the conductive plates carried thereby obtains a capacitance change of a predetermined value upon variations in ambient temperature.

Objects and advantages other than those above set forth will be apparent from the following description when read in connection with the accompanying drawing, in which:

Fig. 1 is a side elevation of a completed capacitor according to the present invention;

Fig. 2 is a top view of the capacitor;

Fig. 3 is a cross section taken on the plane of line III—III of Fig. 2;

Fig. 4 is a cross section taken on the plane of line IV—IV of Fig. 3;

Fig. 5 is an isometric view of the several elements of the present capacitor; and Fig. 6 is a graph showing the changes of capacity (at room temperature) upon variation in the position of plates having different temperature coefficients of dielectric constant.

Generally, the present capacitor includes a metallic casing having a mounting stud and locating peg secured on the casing and extending therefrom. A base member is fixed in the casing in such manner as to define an enclosed space receiving the capacitor parts which are to be movable relatively to the casing and the base. Such relative movable parts include a shaft extending through the base into the enclosed space to bear a pair of coacting half-discs pressed on the base and secured to the shaft by a spring member on the end of the shaft. One of the conductive plates of the capacitor is supported on the base member and other conductive plates of the capacitor are severally supported on the half-discs.

Referring particularly to the drawing, the casing generally designated 10 is a substantially cylindrical cup with an enlarged lip portion 11 providing a shoulder 12 in the casing side wall. The casing has a stud 13 fixed centrally in the bottom of the cup and projecting outwardly therefrom and threaded to receive a nut, whereby the capacitor may be mounted on a suitable support (not shown). A peg 14 is fixed in the bottom of the casing adjacent the peripheral edge to engage with the support and to coact with the stud in fixing the location of the casing, and the capacitor as a whole, relative to the support.

A base 20 is formed of insulating material preferably such as steatite in the general form of a disc with a peripheral flange 21. An aperture 22 is formed centrally through the base and is enlarged at one end to provide a shoulder or seat 23 and a second aperture 24 extends through the base adjacent the periphery of the base body portion and is also formed with an enlarged end to provide a shoulder 25, the purpose of both openings and of their shoulders being described hereinafter. Approximately one-half of one end surface of the base has formed thereon a coating 26, indicated herein by vertical lining, of electrically conductive material such as silver to serve as one conductive plate of the capacitor. A terminal 27 for the plate 26 is formed as a pin inserted in the aperture 24 and held in good conductive contact with a portion of the plate 26 extending over shoulder 25, by a spring washer 28 seated on the aperture shoulder 25 and having the end of the pin 27 upset or peened thereover.

A bushing 30 with an enlarged and socketed head 31 extends through the base aperture 22 and is fixed therein by upsetting or peening the end of the bushing over a washer 32 seating on the aperture shoulder 23. A terminal 33 is fitted closely on the bushing beneath the bushing head and has an ear 34 extending beyond the end surface of the bushing head. A shaft 37 extends beyond the end surface of the base and is formed with a portion rotatably seating in the socket in the bushing head 31. The shaft has a partial flange 38 extending over the bushing head for such distance that the ends of the flange may engage with the terminal ear 34, which thus serves as a stop for limiting rotational movement of the shaft produced by a suitable tool inserted in a slot 39 in the end of the shaft.

The end of the shaft 37 which is within the space enclosed by the casing and the base has fixed thereon a spring member 42 which is concave and acts as a leaf spring, the member having four bifurcated or split fingers 43 extending from the body of the spring at spacings of substantially a quadrant. The purpose of the spring is to press two half-discs generally designated 46 and 47 into contact with the plate 26 on the adjacent end surface of the base 20. The half-discs are structurally the same and therefore only one such half-disc will be described. The discs are made with a relatively thin body portion 48 having the sides thereof formed parallel and with the side surface, which is intended to contact with conductive plate 26, finished flat and smooth. The other side surface of the several half-discs is partially coated with conductive material such as silver, severally indicated by vertical lining at 49 and 50, and forming other capacitor conductive plates. Each of the discs is formed with a flange 51 extending from the disc body along the diametrical edge of the disc and with a heavier flange 52 formed along the arcuate edge of the disc. The flange 52 is formed with notches 53 severally receiving the spring fingers 43 which press the flat and smooth surface of the half-discs closely on the surface of the base 20 bearing the conductive coating 26. The radial spring fingers 43 also co-act with notches 53 to retain the discs 46, 47 in assembled relationship with respect to the shaft 37. The conductive coatings 49, 50 are formed over a portion of the arcuate flanges of the discs 46 and 47 into the notches 53 to contact with the spring fingers so that the terminal for the several plates 49, 50 actually includes the spring 42, the shaft 37, the bushing 30 and the terminal 33. The chemical composition of the two half-discs is such that the disc 46 has a positive temperature coefficient for its dielectric constant while the disc 47 has a negative temperature coefficient for its dielectric constant.

When the base 20 has assembled thereon the various elements described above as being mounted in or on such base and after the half-discs are inserted between the coated base surface and their respective spring fingers, the bushing 30 and the terminal 27 are fixed on the base as by soldering. The assembled base, etc., is then inserted in the casing with the base flange 21 resting on the casing shoulder 12 whereupon the casing lip 11 is formed over the flange and is also joined with the flange as by soldering.

Fig. 6 graphically illustrates the change in temperature coefficient in parts per million per degree centigrade for the two discs 46, 47 plotted against the degree of clockwise rotation of such discs (as viewed in Fig. 2 and indicated by an arrow in Fig. 5) starting from a zero position in which disc 46 is fully superimposed over plate 26. In this position disc 46, which has a dielectric with a positive temperature coefficient of approximately eighty, will be the main effective element of the capacitor. In such position, the disc 47 having a negative temperature coefficient will have only negligible edge effect on the capacitance. As the discs rotate from the zero position to the ninety degree position (shown in Figs. 4 and 5) only one-half of the disc 46 will then be effective while one-half of the disc 47 will then be effective. As the disc 47 has a dielectric with a negative temperature coefficient of substantially two hundred, the total combined temperature coefficients of the two discs will be approximately a negative sixty. Thus the curve indicated by T represents the change in the combined temperature coefficient per degree of rotation. Because of the edge effect between the coatings the capacitance of the capacitor will vary as the discs are rotated from the zero position above described to the ninety degree position of Figs. 4 and 5 and the ultimate other end position even though the temperature remains constant during such rotation. This change is shown by the curve designated C. Such curve was made by rotating the discs through the full extreme of travel while maintaining the temperature constant. As the discs move from the zero position the change in capacitance decreases until at approximately nineteen degrees there is no change in capacitance. Thereafter the change in capacitance increases to substantially .5 m. m. f. at the sixty degree position and thence decreases to zero change at approximately one hundred thirty degrees and decreases further approximately .5 m. m. f. at one hundred eighty degrees. Such capacity change range, due to edge effect as the plates are rotated, is, as shown from curve C, relatively slight.

The present capacitor may be employed only as a means for determining capacitance change in a given circuit over a predetermined range and may then be replaced by a less expensive variable capacitor or even with a fixed capacitor having the desired capacitance change over the given temperature range. However, there are also many circuits which must be exactly adjusted at different times for such wide temperature ranges that the necessary capacitance change can be obtained only by the use of a variable capacitor having elements with both positive and negative temperature coefficients coacting as above described. Instead of using two conductive plates, as shown, it is also possible to obtain the desired effect by varying the area of the plates thus obtaining a "capacity change" curve differing widely from the relatively flat curve shown. Differently shaped conductive plates may also be used to produce a rate of capacitance change increasing or decreasing as the degree of rotation varies.

Although but one embodiment of the present invention has been illustrated and described it will be apparent to those skilled in the art that various changes and modifications may be made therein without departing from the spirit of the invention or from the scope of the appended claim.

We claim:

In an electric capacitor, a base member of insulating material having a fixed conductive plate formed as a coating thereon, a shaft journalled in the base, a plurality of dielectric members formed as half-discs and having different temperature coefficients, the half-discs being adapted for movement with the shaft and having a flange on the arcuate edges thereof provided with notches for receiving the bifurcated fingers of a leaf spring, conductive plates on the dielectric members and being adapted for movement with the half-discs relative to the fixed plate, said plates having portions extending into said notches, a leaf spring fixed on the shaft and having spring fingers with bifurcated ends engageable in said notches for urging the half-discs into contact with the fixed plate and for engaging the half-discs to hold them fixed relative to the shaft, said fingers and said conductive plate portions being in contact to form an electrical conductive engagement between said plates and said shaft, and means for rotating the shaft to bring the movable plates sequentially into opposite relationship with the fixed plate.

GEORGE M. EHLERS.
GEORGE T. KODAMA.

REFERENCES CITED

The following references are of record in the file of this patent:

UNITED STATES PATENTS

| Number | Name | Date |
|---|---|---|
| 1,620,020 | Hardy | Mar. 8, 1927 |
| 2,091,616 | Stoekle | Aug. 31, 1937 |
| 2,156,056 | Hornung | Apr. 25, 1939 |
| 2,305,355 | Lips | Dec. 15, 1942 |
| 2,326,341 | Ehlers | Aug. 10, 1943 |
| 2,348,693 | Minnium | May 9, 1944 |

FOREIGN PATENTS

| Number | Country | Date |
|---|---|---|
| 462,639 | Great Britain | Mar. 12, 1937 |
| 519,334 | Great Britain | Mar. 21, 1940 |